(12) United States Patent
Allen, Jr. et al.

(10) Patent No.: US 8,335,691 B2
(45) Date of Patent: Dec. 18, 2012

(54) ATTACHING AUDIO GENERATED SCRIPTS TO GRAPHICAL REPRESENTATIONS OF APPLICATIONS

(75) Inventors: Lloyd W. Allen, Jr., Cary, NC (US);
Jana Helton Jenkins, Raleigh, NC (US);
Steven Michael Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 12/346,999

(22) Filed: Dec. 31, 2008

(65) Prior Publication Data
US 2010/0169754 A1 Jul. 1, 2010

(51) Int. Cl.
*G10L 21/00* (2006.01)
*G10L 15/00* (2006.01)
*G10L 15/04* (2006.01)
(52) U.S. Cl. .......... 704/275; 704/231; 704/251
(58) Field of Classification Search .......... 704/251
See application file for complete search history.

(56) References Cited

U.S. PATENT DOCUMENTS

| 4,582,441 | A | 4/1986 | Carter et al. |
| 5,761,641 | A * | 6/1998 | Rozak et al. ............ 704/275 |
| 5,875,429 | A * | 2/1999 | Douglas ............... 704/275 |
| 5,950,167 | A | 9/1999 | Yaker |
| 6,434,547 | B1 * | 8/2002 | Mishelevich et al. ........ 1/1 |
| 6,526,381 | B1 | 2/2003 | Wilson |
| 7,006,968 | B2 | 2/2006 | Norris et al. |
| 7,240,006 | B1 * | 7/2007 | Brocious et al. .......... 704/270 |
| 7,426,469 | B1 * | 9/2008 | Grant et al. ............ 704/275 |
| 7,941,481 | B1 * | 5/2011 | Partovi et al. ........... 709/203 |
| 2004/0225498 | A1 * | 11/2004 | Rifkin ............... 704/250 |
| 2005/0149337 | A1 * | 7/2005 | Asadi et al. ............ 704/277 |
| 2006/0047977 | A1 * | 3/2006 | Hanasaki ............. 713/193 |

* cited by examiner

*Primary Examiner* — Jesse Pullias
(74) *Attorney, Agent, or Firm* — Grasso PLLC (57) ABSTRACT

A computer implemented method, a computer program product, and a data processing system attach audio generated scripts to graphical representations of applications. A mobile device records an audio instruction. The mobile device then converts the audio instruction into a command script and associates the command script with a document identifier. The mobile device then forwards the document identifier and the associated command script to a target location. The command script can then be utilized at the target location to make changes to a document identified by the document identifier.

17 Claims, 4 Drawing Sheets

ATTACHING AUDIO GENERATED SCRIPTS TO GRAPHICAL REPRESENTATIONS OF APPLICATIONS

BACKGROUND OF THE INVENTION

1. Field of the Invention

The present invention relates generally to a computer implemented method, a computer program product, and a data processing system. More specifically, the present invention relates generally to a computer implemented method, a computer program product, and a data processing system for attaching audio generated scripts to graphical representations of applications.

2. Description of the Related Art

With the ever expanding global marketplace and the constant travel required by much of today's workforce, employees are often required to remotely review and edit documents. Although laptop computers are often used for this review and edit, the user of a laptop requires access to the document which is to be edited. Additionally, a laptop is not easily accessed while driving, or during other activities requiring much of a user's attention.

However, devices such as personal digital assistants (PDAs) or Internet cellular phones allow a user to access a computer network to send and receive information. While it is often desirable to be able to access documents stored on a central computer or within the accessed network for review and/or minor editing, the limited processing power, storage capacity, and available bandwidth of these devices often make intensive editing impractical.

BRIEF SUMMARY OF THE INVENTION

According to one embodiment of the present invention, a computer implemented method, a computer program product, and a data processing system are provided for attaching audio generated scripts to graphical representations of applications. A mobile device records an audio instruction. The mobile device then converts the audio instruction into a command script and associates the command script with a document identifier. The mobile device then forwards the document identifier and the associated command script to a target location. The command script can then be utilized at the target location to make changes to a document or documents identified by the document identifier.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note, that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
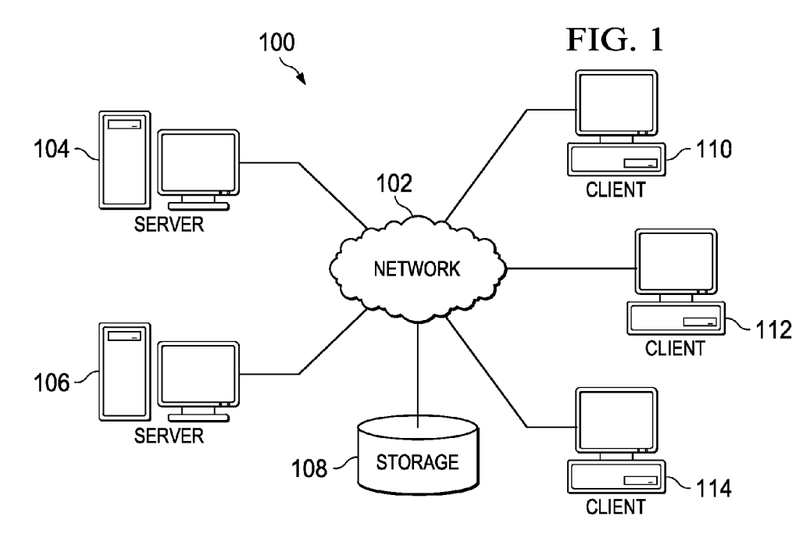
FIG. 1 is a pictorial representation of a network of data processing systems in which illustrative embodiments may be implemented.
Figure 2:
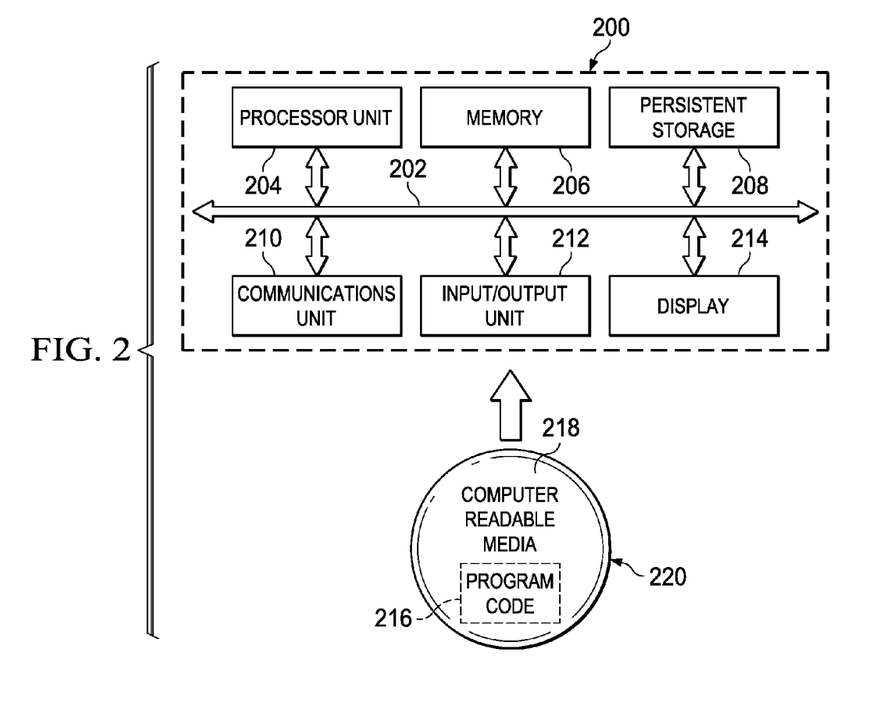
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 of FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments provide a computer implemented method, a data processing system, and a computer program product for the attachment of audio generated scripts to graphical representations of applications. A mobile device records an audio instruction. The mobile device then converts the audio instruction into a command script and associates the command script with a document identifier. The mobile device then forwards the document identifier and the associated command script to a target location. The command script can then be utilized at the target location to make changes to a document identified by the document identifier.

Figure 3:
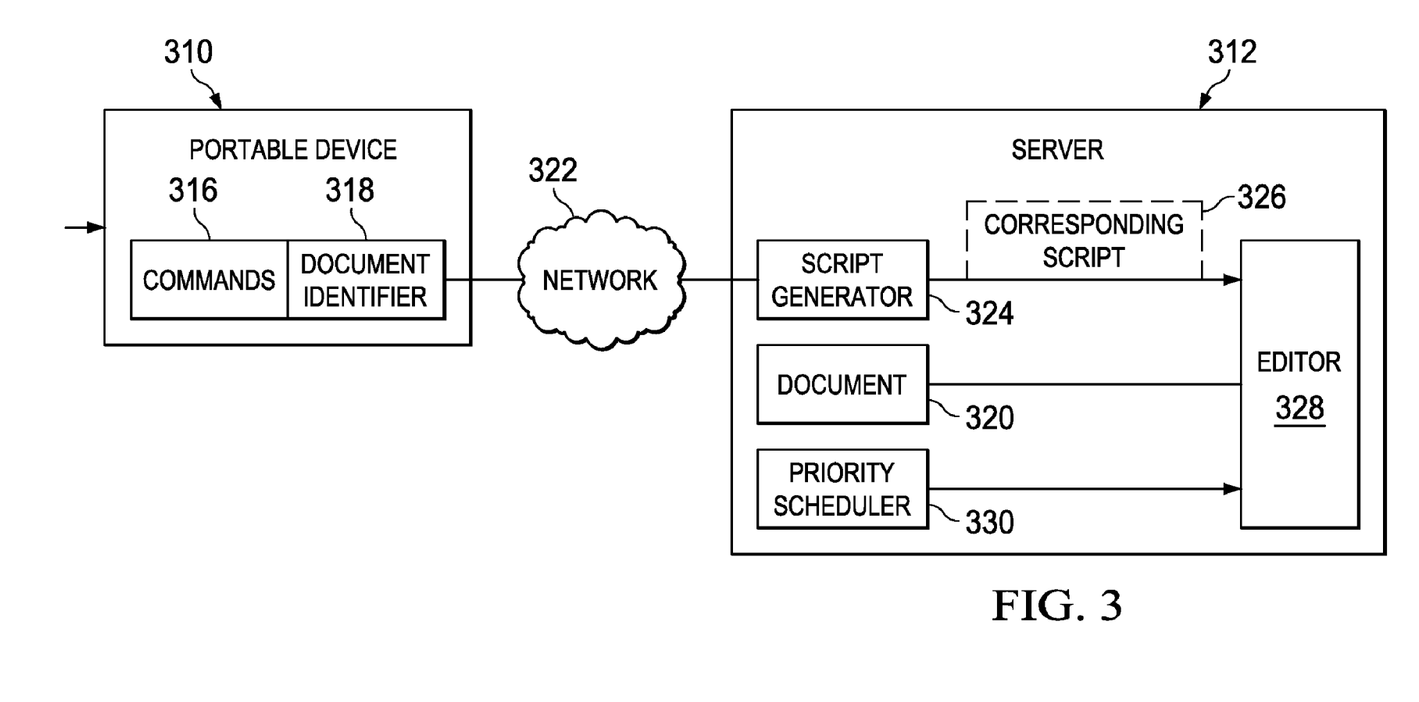
FIG. 3 is a data flow for major system components according to an illustrative embodiment.

Referring now to FIG. 3, a data flow for major system components is shown according to an illustrative embodiment. Portable device 310 is a portable data processing system, such as one of clients 110, 112, and 114 of FIG. 1. Server 312 is a data processing system such as server 104 and 106 of FIG. 1.

A user initially inputs instructions into portable device 310. The input instructions impart a series of commands 316 to portable device 310, which can be alphanumeric text based commands, or can be audio commands. Commands 316 is an instruction or series of instructions detailing changes that are to be made to a document, such as document 320. Commands 316 are attached to document identifier 318. Document identifier 318 is an indication of the file or files to which commands 316 should be applied. In one illustrative embodiment, document identifier 318 can be an icon. Document identifier 318 also defines a format for a generated command script to be generated by script generator 324. Document identifier 318 can be a generic identifier. Generic identifiers associate commands 316 with an application type, such that a script generated from commands 316 can be independently applied to any document of a target application type. Conversely, document identifier 318 can be a specific identifier. A specific identifier associates commands 316 with a specific document, such as document 320, such that a script generated from commands 316 can be applied only to a specifically indicated document of the target application type. If the document identifier 318 is a specific identifier, document identifier 318 can include a network address of the underlying document 320.

The context of the underlying application type determines the scope of commands 316. That is, commands 316 are specific to a certain expected document type, and the selected document identifier 318 identifies that document type. For example, but not limited to, if commands 316 are expected to execute on a word processing document, a user selects document identifier 318 that identifies the word processing application.

In one illustrative embodiment, the user indicates document identifier 318 by selecting an icon on portable device 310, the icon representing an expected document type to which a generated command script 326 is ultimately applied to. Document identifier 318 would therefore be the icon, which points to, or otherwise indicates underlying document type for document 320.

Commands 316 can then be recorded and associated with document identifier 318 as metadata. Commands 316 are initially entered as either alphanumeric text based commands, or can be audio commands. If commands 316 are audio commands, portable device 310 will attach the commands 316 to document identifier 318 as a sound file, such as for example, but not limited to a .wav file, a .raw file, a .ogg file, a .mp3 file, a .mp4 file, a .ra file, a .mpa file, a .mpc file, an .aiff file, an .au file, a .gsm file, a .dct file, a .vox file, an .aac file, a .wma file, a .msv file, and a .dvf file.

If commands 316 are alphanumeric text based commands, portable device 310 will attach the commands 316 to document identifier 318 as a text file, such as for example, but not limited to, a .txt file, a .doc file, and a .wpd file. Additionally, alphanumeric text based commands can be stored as commands in a markup language, such as an extensible markup language.

Document identifier 318 including commands 316, is then forwarded through network 322, which can be network 102 of FIG. 1, to server 312. Server 312 is a server such as one of server 104 and server 106 of FIG. 1.

Server 312 includes script generator 324. Script generator 324 is a software component that parses commands 316, and creates script 326 that can be executed on document 320 in order to make the changes indicated by commands 316.

If document identifier 318 is a specific identifier, a script generated from commands 316 can be applied only to a specifically indicated document of the target application type. If document identifier 318 is a specific identifier, script 326 is of the file type of document 320. Script 326 is under execution control of the target application program of document 320.

If document identifier 318 is a generic identifier, a script generated from commands 316 can be independently applied to any document of a target application type. If document identifier 318 is a generic identifier, script 326 is an independent file type. Script 326 is under execution control of an associated scripting control engine, which can be editor 328, common for all target file types.

Script generator 324 may include functionality to parse audio commands into a text script. If commands 316 are audio commands, various parameters from audio commands, are identified. The audio commands are typically divided to frames, and each frame undergoes a short-time Fourier transformation, or other digital transformation, to create a spectral representation of the audio commands. Characteristics of the transformed audio commands are isolated from each of the transformed media signal frames, and compared to statistical models of known subject matter to determine similarities using known statistical classification methods, such as K-nearest neighbor, Gaussian mixture modeling, support vector machines, vector quantization, hidden Markov modeling, and multivariate auto-regression modeling. A probable text corresponding to the audio commands can then be determined.

Server 312 includes editor 328. Editor 328 is a software process that executes corresponding script 326 on document 320 in order to make the changes indicated by commands 316 to document 320.

Script 326 exists as a distinct entity from document 320. Because script 326 exists as a distinct entity, script 326 can be applied to any number of documents, such as document 320, so long as each of the documents are related to a common application type. For example, but not limited to, if script 326 applies to a word processing application type. Editor 328 can therefore apply script 326 to document 320, as well as additional documents of a common word processing application type.

In an alternative embodiment, a second user can access corresponding script 326, and manually make the indicated changes to document 320. Changes indicated by script 326 can be optionally and individually confirmed or rejected at the time of being applied to document 320.

In an illustrative embodiment, one or more scripts, such as script 326 can be attached to a single file, such as document 320. If multiple scripts are attached to a single file, priority scheduler 330 may be invoked to give priority to a certain one of the attached scripts. Priority scheduler 330 is a software process that gives priority to a certain one of the attached scripts. Priority scheduler 330 may give priority to a certain script based selection by a user. Priority scheduler 330 may also give priority based on priority ratings associated with the attached scripts. The priority ratings can be based on, for example, but not limited to, a time when the script was recorded, the author of the script, the type of content which the script is changing, and an indication of a classification of the script, wherein scripts within a certain class could be effected within any order.

Figure 4:
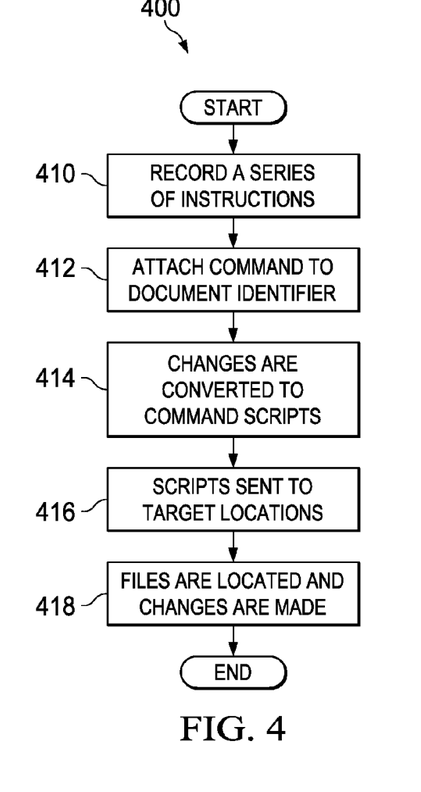
FIG. 4 is a high level flowchart illustrating the various processing steps for receiving instructions and processing script commands on a document according to an illustrative embodiment.

Referring now to FIG. 4, a high level flowchart illustrating the various processing steps for receiving instructions and processing script commands on a document is shown according to an illustrative embodiment. Process 400 is a high level software process, executing in conjunction with a plurality of software components, such as on a software component of portable device 310 of FIG. 3, on script generator 324 of FIG. 3, and editor 328 of FIG. 3.

Process 400 begins by recording a series of commands (step 410). The commands can be commands 316 of FIG. 3. A user initially inputs commands into a portable device. The commands can be alphanumeric text based commands, or can be audio commands. The commands are instructions detailing changes that are to be made to a document, such as document 320 of FIG. 3.

Process 400 then attaches the commands to a document identifier (step 412). The commands indicate a document identifier. The document identifier is an indication of the file or files to which the commands should be applied. The document identifier also defines a format for a generated command script to be generated by a script generator. The document identifier can be a generic identifier. Generic identifiers associate the commands with an application type, such that a script generated from the commands can be independently applied to any document of a target application type. Conversely, the document identifier can be a specific identifier. A specific identifier associates the commands with a specific document, such as document 320 of FIG. 3, such that a script generated from the commands can be applied only to a specifically indicated document of the target application type. If the document identifier is a specific identifier, the document identifier can include a network address of the underlying document.

Responsive to attaching the commands to a document identifier, process 400 forwards the script to a target location (step 414). The target location is typically a data processing system with access to the document identified by the document identifier. In one illustrative embodiment, the target location is the data processing system on which the identified document resides, such as server 312 of FIG. 3.

In one illustrative embodiment, the user indicates a document identifier, such as document identifier 318 of FIG. 3, by selecting an icon on a portable device, the icon representing a document. The document identifier would therefore be a representation of the icon, which points to, or otherwise indicates an underlying document.

Process 400 then converts the instructions to command scripts (step 416). If the instructions are alphanumeric text based commands, script generator can parse the alphanumeric text based commands into the script commands, implementing appropriate formatting.

If the instructions are audio commands, various parameters from audio commands, are identified. The audio commands are typically divided to frames, and each frame undergoes a short-time Fourier transformation, or other digital transformation, to create a spectral representation of the audio commands. Characteristics of the transformed audio commands are isolated from each of the transformed media signal frames, and compared to statistical models of known subject matter to determine similarities using known statistical classification methods, such as K-nearest neighbor, Gaussian mixture modeling, support vector machines, vector quantization, hidden Markov modeling, and multivariate auto-regression modeling. A probable text corresponding to the audio commands can then be determined. The probable text can then be parsed into the script commands, implementing any appropriate formatting.

Process 400 then locates the indicated files, and makes the changes indicated by the script commands (step 418), with the process terminating thereafter. Changes to the document can be made by a software process, such as editor 328 of FIG. 3.

Figure 5:
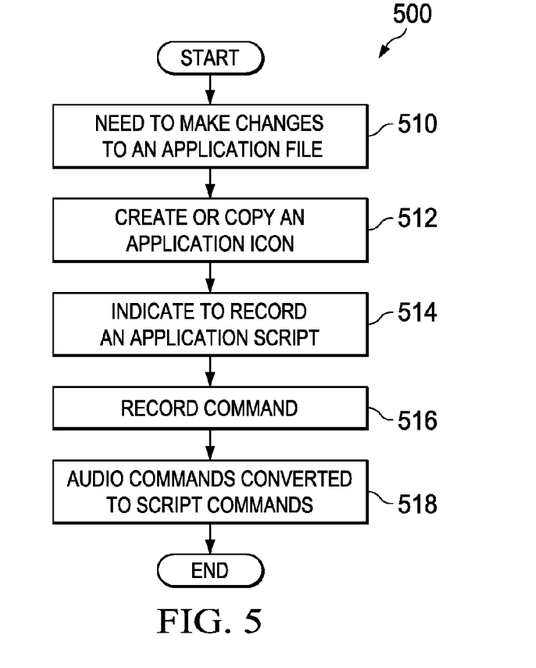
FIG. 5 is a flowchart for inputting a set of instructions, and forwarding the set of instructions to a server for script conversion according to an illustrative embodiment.

Referring now to FIG. 5, a flowchart for inputting a set of instructions, and forwarding the set of instructions to a server for script conversion is shown according to an illustrative embodiment. Process 500 is a software processes executing on a software component of a portable device, such as portable device 310 of FIG. 3.

Process 500 begins by receiving an indication that changes should be made to an application file (step 510). This indication is received by a user inputting an instruction or series of instructions, such as commands 316 of FIG. 3 into the portable device. The instructions can include alphanumeric text based commands or audio commands.

Responsive to receiving an indication that changes should be made to an application file, process 500 creates or copies an application icon (step 512). The copied application icon is a simple method to associate the instructions that will be received with an application that will be used to open or edit the application file. The application icon can be document identifier 318 of FIG. 3. The document identifier is an indication of the file or files to which the commands should be applied. The document identifier also defines a format for a generated command script to be generated by a script generator. The document identifier can be a generic identifier. Generic identifiers associate the commands with an application type, such that a script generated from the commands can be independently applied to any document of a target application type. Conversely, the document identifier can be a specific identifier. A specific identifier associates the commands with a specific document, such as document 320 of FIG. 3, such that a script generated from the commands can be applied only to a specifically indicated document of the target application type. If the document identifier is a specific identifier, the document identifier can include a network address of the underlying document.

Process 500 can then receive an indication to record an application script (step 514). The application script is entered as an instruction, or series of instructions, such as commands 316 of FIG. 3, into the portable device. The instructions can include alphanumeric text based commands or audio commands.

Responsive to receiving the indication to record an application script, process 500 then records the commands (step 516). The instructions can be commands 316 of FIG. 3. The instructions can include a series of commands, which can be alphanumeric text based commands, or audio commands. The commands are an instruction or series of instructions detailing changes that are to be made to a document. The instructions can also include a document identifier, indicating a file or files to which the series of commands should be applied. The instructions can be associated with the copied application icon.

Process 500 can then forward the instructions to a data processing system for conversion of the commands into script commands, and execution thereof (step 518), with the process terminating thereafter. The script commands can then be executed to make the indicated changes to the desired document. The instructions can be forwarded to the data processing system by forwarding the copied application icon to the data processing system.

Figure 6:
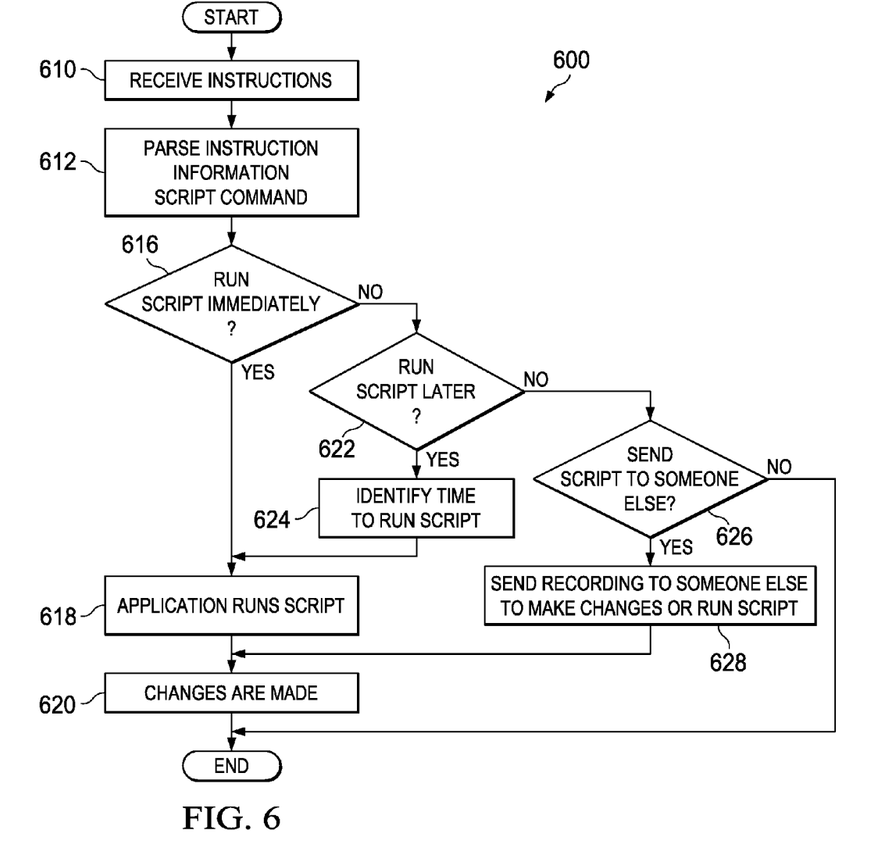
FIG. 6 is a process for parsing instructions, generating a script, and executing a script according to an illustrative embodiment.

Referring now to FIG. 6, a process for parsing instructions, generating a script, and executing a script is shown according to an illustrative embodiment. Process 600 is a software process, executing on a software component, such as script generator 324 of FIG. 3.

Process 600 begins by receiving a series of instructions from a portable device (step 610). The series of instructions can be commands 316 of FIG. 3. The portable device can be portable device 310 of FIG. 3. The series of instructions are received attached to a document identifier, such as document identifier 318 of FIG. 3. The document identifier is an indication of the file or files to which the commands should be applied. The document identifier also defines a format for a generated command script to be generated by a script generator. The document identifier can be a generic identifier. Generic identifiers associate the commands with an application type, such that a script generated from the commands can be independently applied to any document of a target application type. Conversely, the document identifier can be a specific identifier. A specific identifier associates the commands with a specific document, such as document 320 of FIG. 3, such that a script generated from the commands can be applied only to a specifically indicated document of the target application type. If the document identifier is a specific identifier, the document identifier can include a network address of the underlying document.

Process 600 then parses the instructions into script commands (step 612). The script commands can be script 326 of FIG. 3. If the instructions are alphanumeric text based commands, the script generator can parse the alphanumeric text based commands into the script commands, implementing any appropriate formatting.

If the instructions are audio commands, various parameters from audio commands, are identified. The audio commands are typically divided to frames, and each frame undergoes a short-time Fourier transformation, or other digital transformation, to create a spectral representation of the audio commands. Characteristics of the transformed audio commands are isolated from each of the transformed media signal frames, and compared to statistical models of known subject matter to determine similarities using known statistical classification methods, such as K-nearest neighbor, Gaussian mixture modeling, support vector machines, vector quantization, hidden Markov modeling, and multivariate auto-regression modeling. A probable text corresponding to the audio commands can then be determined. The probable text can then be parsed into the script commands, implementing any appropriate formatting.

A determination is then made as to whether the script should be immediately run (step 616). Under circumstances where a user may wish to delay implementing the instructions, such as when changes are to be made to a presentation for a different audience, the script commands can be saved for later execution on the desired document. A user could include an indication of the whether the script should be immediately run, or saved for future use, when inputting the instructions, such as in process 400 of FIG. 4.

Responsive to determining that the script should be immediately run ("yes" at step 616), process 600 forwards the script commands to a document editor for execution of the script commands (process 618). The script commands are executed on the document identified by the associated document identifier, such as document identifier 318 of FIG. 3. The document editor can be editor 328 of FIG. 3. The document editor then makes the changes indicated in the script commands to the document (step 620), with the process terminating thereafter.

Returning now to step 616, responsive to not determining that the script should be immediately run ("no" at step 616), process 600 makes a determination if the script commands should be run at a certain later time (step 622). Responsive to determining that the script commands should be run at a certain later time ("yes" at step 622), process 600 would then identify the time at which the script commands should be run (step 624). Upon the occurrence or lapse of that later time, process 600 forwards the script commands to a document editor for execution of the script commands (process 618). The script commands are executed on the document identified by the associated document identifier, such as document identifier 318 of FIG. 3. The document editor can be editor 328 of FIG. 3. The document editor then makes the changes indicated in the script commands to the document (step 620), with the process terminating thereafter.

Returning now to step 622, responsive to determining that the script commands should not be run at a certain later time ("no" at step 622), process 600 determines whether the script commands should be sent to a different user (step 626). Under circumstances where a user may wish the changes to be viewed by another person prior to implementation, the script commands can be forwarded to the different user prior to implementation into the identified document. Responsive to identifying the script commands should be sent to a different user ("yes" at step 626), process 600 forwards the scrip to the different user (step 628). The different user can then execute the script commands on the document identified by the associated document identifier, such as document identifier 318 of FIG. 3. The document editor can be editor 328 of FIG. 3. The document editor then makes the changes indicated in the script commands to the document (step 620), with the process terminating thereafter. In an alternative embodiment, the different user could manually make changes to the indicated document, using the script as a guide.

Returning now to step 626, responsive to not identifying the script commands should be sent to a different user ("no" at step 626), process 600 terminates. The script is not executed. The script can be saved for review or execution at a later time.

Thus, the illustrative embodiments herein provide a computer implemented method, a computer program product, and a data processing system for attaching audio generated scripts to graphical representations of applications. A mobile device records an audio instruction. The mobile device then converts the audio instruction into a command script and associates the command script with a document identifier. The mobile device then forwards the document identifier and the associated command script to a target location. The command script can then be utilized at the target location to make changes to a document identified by the document identifier.

The flowchart and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for attaching an audio generated script to a document identifier within a data processing system, the computer implemented method comprising:
    receiving a command from a user indicating that changes should be made to a document;
    creating a document identifier, the document identifier identifying a network address of a document to be opened and defining a format for a generated script;
    recording an audio instruction via a portable device adapted to record audio instructions;
    converting the audio instruction into a command script;
    forwarding the document identifier and the command script to a target location within a data processing system;
    determining whether the script should be immediately run or run at a later time;
        responsive to determining the script should run at a later time, identifying the later time at which the script should be run and running the script at the later time;
        responsive to determining that the script should be run immediately, determining whether the script is to be sent to another user;
        responsive to determining the script is to be sent to another user, forwarding the script to another user to make changes to the document as indicated in the script commands; and
        responsive to determining the script is not to be sent to another user, saving the script for later review or execution.

2. The computer implemented method of claim 1 further comprising:
    receiving an indication that a change should be made to a document identified by the document identifier.

3. The computer implemented method of claim 2, wherein the indication is selected from the group consisting of an alphanumeric text based indication and an audio indication.

4. The computer implemented method of claim 1, wherein the audio instruction is a sound file selected from the group consisting of a .wav file, a .raw file, a .ogg file, a .mp3 file, a .mp4 file, a .ra file, a .mpa file, a .mpc file, an .aiff file, an .au file, a .gsm file, a .dct file, a .vox file, an .aac file, a .wma file, a .msv file, and a .dvf file.

5. The computer implemented method of claim 1, wherein converting the audio instruction into a command script further comprises:
    dividing the audio instructions into frames;
    creating a spectral representation of the frames;
    isolating characteristics from the spectral representation;
    comparing the isolated characteristics to a statistical model, wherein the comparing utilizes a method selected from the group consisting of K-nearest neighbor, Gaussian mixture modeling, support vector machines, vector quantization, hidden Markov modeling, and multivariate auto-regression modeling; and
    determining a probable text; and
    converting the probable text into the command script.

6. The computer implemented method of claim 1 further comprising:
    receiving the document identifier and the associated command script at the target location of the data processing system;
    locating a document at the target location, wherein the document identifier indicates the document; and
    making changes to the document according to the command script.

7. A computer-readable non-transitory medium having a computer program product encoded thereon for attaching an audio generated script to a document identifier, the computer-readable non-transitory medium having a computer program product encoded thereon comprising computer usable program code for:
    receiving a command from a user indicating that changes should be made to a document;
    creating a document identifier, the document identifier identifying a network address of a document to be opened and defining a format for a generated script;
    recording an audio instruction via a portable device adapted to record audio instructions;
    converting the audio instruction into a command script;
    forwarding the document identifier and the command script to a target location within a data processing system;
    determining whether the script should be immediately run or run at a later time;
        responsive to determining the script should run at a later time, identifying the later time at which the script should be run and running the script at the later time;
        responsive to determining that the script should be run immediately, determining whether the script is to be sent to another user;
        responsive to determining the script is to be sent to another user, forwarding the script to another user to make changes to the document as indicated in the script commands; and
        responsive to determining the script is not to be sent to another user, saving the script for later review or execution.

8. The computer-readable medium of claim 7 further comprising computer usable program code for:
    receiving an indication that a change should be made to a document identified by the document identifier.

9. The computer-readable medium of claim 8, wherein the indication is selected from the group consisting of an alphanumeric text based indication and an audio indication.

10. The computer-readable medium of claim 7, wherein the audio instruction is a sound file selected from the group consisting of a .wav file, a .raw file, a .ogg file, a .mp3 file, a .mp4 file, a .ra file, a .mpa file, a .mpc file, an .aiff file, an .au file, a .gsm file, a .dct file, a .vox file, an .aac file, a .wma file, a .msv file, and a .dvf file.

11. The computer-readable medium of claim 7, wherein the computer usable program code for converting the audio instruction into a command script further comprises:
   computer usable program code, for dividing the audio instructions into frames;
   computer useable program code, for creating a spectral representation of the frames;
   computer usable program code, for isolating characteristics from the spectral representation;
   computer usable program code, for comparing the isolated characteristics to a statistical model, wherein the comparing utilizes a method selected from the group consisting of K-nearest neighbor, Gaussian mixture modeling, support vector machines, vector quantization, hidden Markov modeling, and multivariate auto-regression modeling; and
   computer usable program code, for determining a probable text; and
   computer usable program code, for converting the probable text into the command script.

12. The computer-readable medium of claim 7 further comprising:
   computer usable program code, for receiving the document identifier and the associated command script at a data processing system, wherein the data processing system includes the target location;
   computer usable program code, for locating a document at the target location, wherein the document identifier indicates a document; and making changes to the document according to the command script.

13. A data processing system comprising:
   a bus;
   a storage device connected to the bus, wherein the storage device includes computer usable program code for:
      receiving a command from a user indicating that changes should be made to a document;
      creating a document identifier, the document identifier identifying a network address of a document to be opened and defining a format for a generated script;
      recording an audio instruction via a portable device adapted to record audio instructions;
      converting the audio instruction into a command script;
      forwarding the document identifier and the associated command script to a target location within a data processing system;
      determining whether the script should be immediately run or run at a later time;
         responsive to determining the script should run at a later time, identifying the later time at which the script should be run and running the script at the later time;
         responsive to determining that the script should be run immediately, determining whether the script is to be sent to another user;
         responsive to determining the script is to be sent to another user, forwarding the script to another user to make changes to the document as indicated in the script commands; and
         responsive to determining the script is not to be sent to another user, saving the script for later review or execution;
   a processor unit connected to the bus, wherein the processor unit executes the computer usable program code.

14. The data processing system of claim 13, wherein the processor unit further executes additional computer usable program code to receive an indication that a change should be made to a document identified by the document identifier.

15. The data processing system of claim 14, wherein the indication is selected from the group consisting of an alphanumeric text based indication and an audio indication.

16. The data processing system of claim 13, wherein the audio instruction is a sound file selected from the group consisting of a .wav file, a .raw file, a .ogg file, a .mp3 file, a .mp4 file, a .ra file, a .mpa file, a .mpc file, an .aiff file, an .au file, a .gsm file, a .dct file, a .vox file, an .aac file, a .wma file, a .msv file, and a .dvf file.

17. The data processing system of claim 13, wherein the processor unit executes additional computer usable program code:
   to divide the audio instructions into frames;
   to create a spectral representation of the frames;
   to isolate characteristics from the spectral representation;
   to compare the isolated characteristics to a statistical model, wherein the comparing utilizes a method selected from the group consisting of K-nearest neighbor, Gaussian mixture modeling, support vector machines, vector quantization, hidden Markov modeling, and multivariate auto-regression modeling;
   to determine a probable text; and
   to convert the probable text into the command script.

* * * * *